INVENTOR
HEINZ RUEGG
BY Roger A. Browning
ATTORNEY

—— NO INJECTED SPACE CHARGE
- - - - WITH INJECTED SPACE CHARGE

INVENTOR.
HEINZ RUEGG
BY Roger S. Borovoy
ATTORNEY

INVENTOR.
HEINZ RUEGG
BY Roger S. Borovoy
ATTORNEY

INVENTOR
HEINZ RUEGG
BY Roger S. Borovoy
ATTORNEY

INVENTOR.
HEINZ RUEGG
BY Roger S. Borovoy
ATTORNEY

United States Patent Office 3,488,527
Patented Jan. 6, 1970

3,488,527

PUNCH-THROUGH, MICROWAVE NEGATIVE-RESISTANCE DEVICE

Heinz W. Ruegg, Zurich, Switzerland, assignor to Fairchild Camera and Instrument Corporation, Syosset, N.Y., a corporation of Delaware Filed Sept. 5, 1967, Ser. No. 665,582
Int. Cl. H03k 3/26
U.S. Cl. 307—302 15 Claims

ABSTRACT OF THE DISCLOSURE

A frequency dependent negative resistance is obtained by utilizing the transit time of carriers injected into a depletion region. Injection occurs across a forward biased junction by punch-through. Both a three-layer and a four-layer structure are described with the four-layer structure being preferable since it allows one to obtain an abrupt punch-through and assures high fields and therefore, maximum carrier velocity throughout the depletion region.

This invention relates to semiconductor negative resistance devices and more particularly to a semiconductor P-N junction type of device exhibiting a negative resistance characteristic in the presence of an alternating electrical signal.

A negative resistor is a two-terminal active device which can be used as the power generating element in oscillators and as the gain element in amplifiers. Negative resistance devices have not generally found wirespread application, mainly because they lack the directionality of three-terminal devices. Simple and truly two-terminal negative resistance devices (i.e., devices which are not an assembly of active and passive elements, batteries, etc.) can, however, often be made to operate at higher frequencies than comparable three-terminal devices.

One example of such a basically simple high frequency negative resistance device is the tunnel diode. The negative resistance of the tunnel diode is frequency independent from D-C up to the cut-off frequency. While this property has the advantage of allowing the use of the tunnel diode in D-C and very low frequency circuits, it also makes stable D-C biasing rather difficult for high frequency operation where the device shows its unique potentialities. A device whose resistance is negative only over a limited frequency range but becomes positive below a certain frequency therefore has definite advantages over a D-C negative resistance device such as the tunnel diode. An A-C negative resistance is obtained in a device, if the phase difference between an applied A-C voltage and the A-C current flowing through the device is between 90° and 270°. A pure negative resistance without an additional reactive component is realized if this phase difference is 180°.

In an electronic device, the transit time of charge carriers which are injected by one electrode and collected by another provides a way of achieving the desired phase shift. This mechanism has been known in vacuum diodes for a long time. In U.S. Patent No. 2,794,917, issued June 4, 1957 to W. Shockley, it is proposed to utilize the same principle in three-layer semiconductor devices. In the device disclosed in the Shockley patent, which is of the PNP, PIN, or the converse structure, when a signal of the proper polarity is applied to the device, charge carriers are injected across a forward biased P-N junction into a space charge region or a composite region consisting of a portion in which carrier flow is by diffusion and a space charge region, and then collected by a reverse biased P-N junction. The desired phase shift between the A-C voltage and the A-C current results due to the finite transit time through the center region.

A somewhat similar negative resistance device is shown in U.S. Patent 2,899,652 issued Aug. 11, 1959 to W. T. Read. Unlike the device shown in the Shockley patent, in the Read device, electrons are injected into a depletion region by means of avalanche injection and then collected. The finite transit time needed for the electrons to drift through the depleted region again leads to the phase shift between the A-C voltage and the A-C current.

Two major advantages of the structure proposed by Read over that proposed by Shockley are evident. The first of these advantages is that due to the integrating nature of the avalanche process, that is, the rate at which secondary charge carriers are produced in an avalanche zone is roughly proportional to the number of carriers already present, 90° phase delay of the injected carriers with respect to the applied voltage is initially obtained. Therefore, only a phase delay and an additional 90° is required to obtain a 180° total phase shift between the voltage of current, a situation which corresponds, by definition, to a pure negative resistance. The additional 90° phase shift can be realized very efficiently by making the carrier transit time through the space charge depletion region equal to one-quarter of the period of oscillation of the applied A-C signal.

The second major advantage of the Read structure over the Shockley structure is that since charge carriers are injected by avalanche multiplication in the case of the Read structure, the charge carriers enter the delaying or transit time region (called the drift region by Read) at a point where very high fields exist. By suitable device design, these high fields can be maintained throughout the drift region, thus assuring that the charge carriers will travel at their maximum (scattering limited) velocities and making the structural suitable for very high frequency operation. In contrast to this, in some of Shockley's structures the injected carriers first flow by diffusion before they are picked up by a moderate field, whereas in other versions, the emission of charge carriers across the forward bias junction is space charge limited and therefore, the carriers again drift through relatively low fields at the beginning of their journey. As a result, the negative resistance devices disclosed by Shockley only operate at relatively low frequencies, for example, as mentioned by Shockley, frequencies up to 1 gigahertz.

The structure proposed by Read on the other hand has a number of disadvantages over that disclosed by Shockley. For example, the avalanche process on which the Read structure is based is inherently noisy. This fact leads to negative resistance amplifiers with a very high noise figure and to oscillators which have excessive amplitude and frequency noise. Additionally, a great deal more power is needed to maintain the high fields necessary to maintain avalanche in the Read devices as compared to that required to produce injection from a forward biased junction.

The instant invention is directed to a novel semiconductor negative resistance device which is similar in structure to both the Shockley and Read structures but which combines the advantages of both of these structures while eliminating the disadvantages of each. As in the Shockley device, charge carriers are injected into the delay or transit time region across a forward biased junction. The noise associated with an avalanche process is thereby avoided, and the power efficiency of such an emitter is high compared to an avalanche injection emitter. However, unlike the Shockley structures, the injected carriers then flow through a region where very high fields exist similar to the structures proposed by Read. This fact makes such devices suitable for operation in the microwave range. Moreover, the high fields in the delay region (drift region) assure the possibility of obtaining a high A-C field swing and thus high power output.

Briefly, the negative resistance semiconductor device according to the invention comprises a body of monocrystalline semiconductor material having first and second zones of a first conductivity type separated by a third zone of the opposite conductivity type so that first and second P-N junctions are formed between the first and third and, the second and third zones respectively. A separate electrical contact is provided for each of the first and second zones and the second zone is formed so that at least a portion thereof adjacent the contact thereto is highly conductive, i.e., has a very high impurity concentration. Means are provided for applying a bias potential to the contacts to reverse bias the second junction to a value just below the punch-through potential, i.e., the potential at which the depletion region from the first and second junctions merges. Means are also provided for applying an alternating signal to the body. The alternating voltage signals are of such a magnitude that the combined bias and the signal in the bias aiding direction is sufficient to merge the depletion layer of the first and second junctions, i.e., causing punch-through to occur, and resulting in the subsequent injection of current into the resulting total depletion layer from the first zone and across the forward bias first junction. The second and third zones are provided with widths and impurity concentrations such that the transit time of charge carriers through the total resultant depletion layer results in the phase angle between the applied signal and the alternating current component of the generated current being betwen 90° and 270°.

The invention and the advantages thereof will be more clearly understood from the following detailed description taken in conjunction with the accompanying figures wherein.

Figures 3, 4:
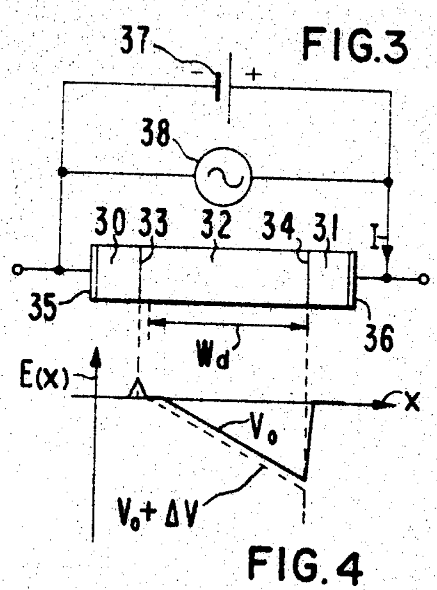
FIG. 3 is a schematic representation of one embodiment of a negative resistance device according to the invention.
FIG. 4 is a plot of the field distribution in the device of FIG. 3 for an applied voltage slightly lower than the punch-through voltage and an applied voltage equal to the punch-through voltage.
Figures 7, 8, 9, 10, 11:
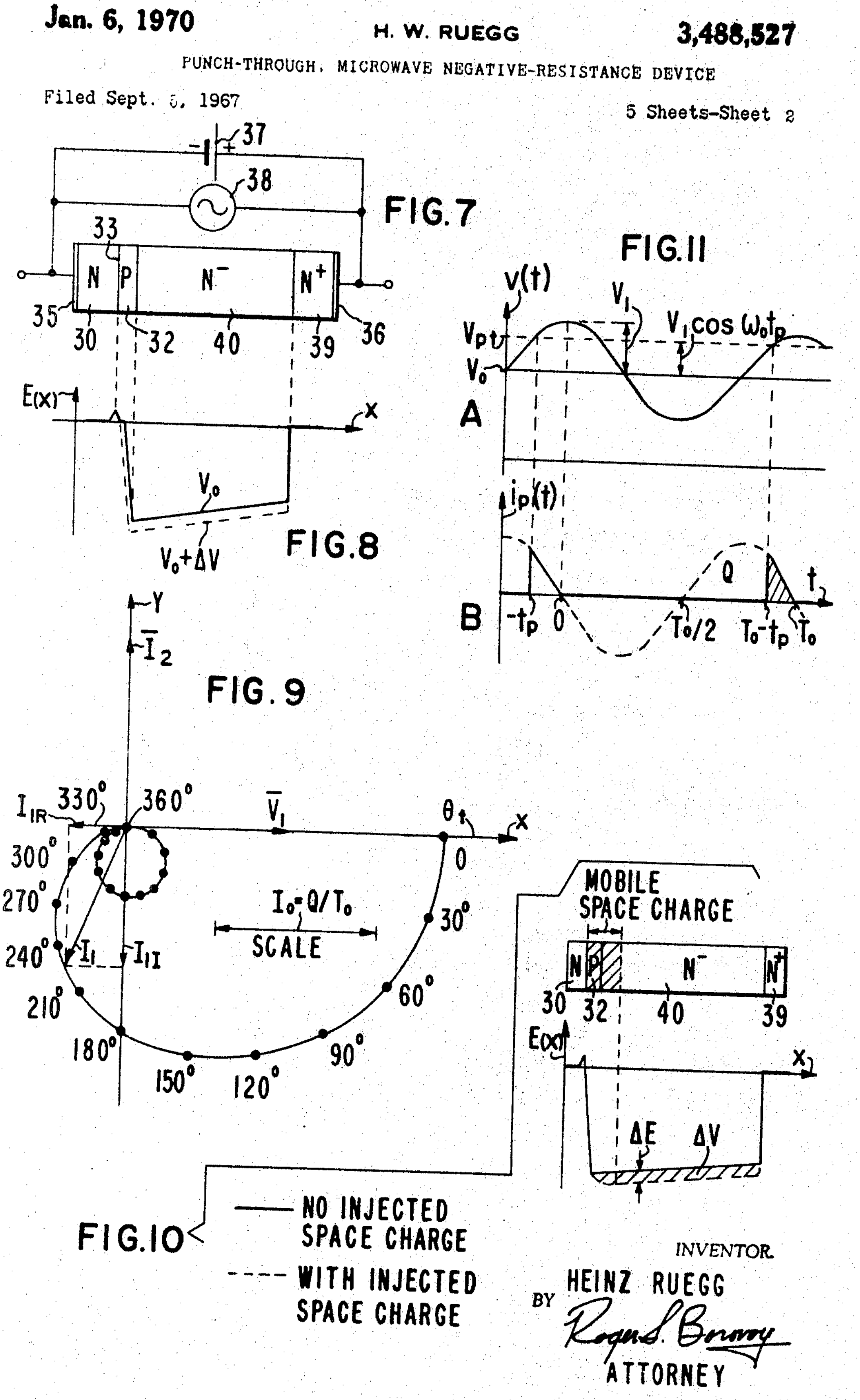
Figure 12:
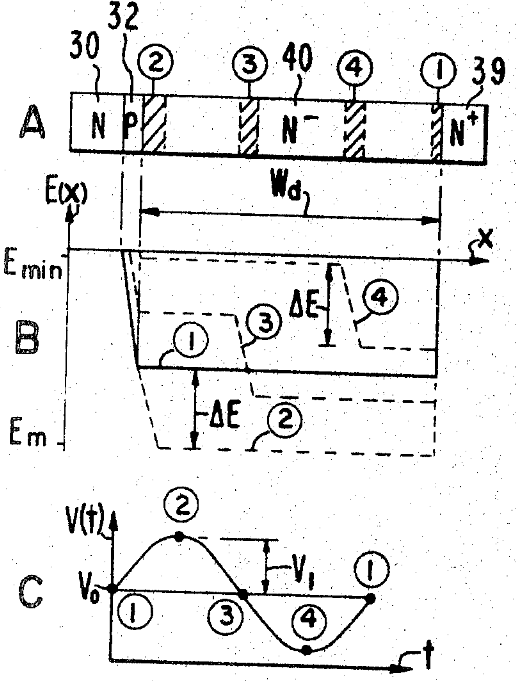
Figure 14:
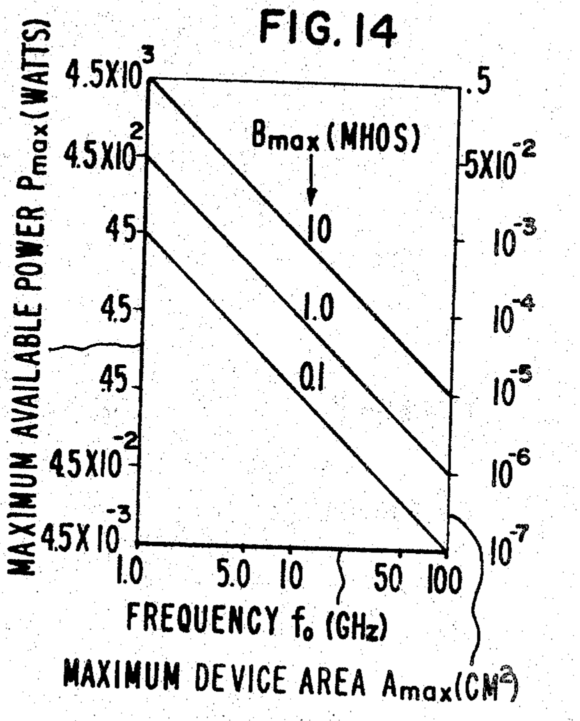
Figure 13:
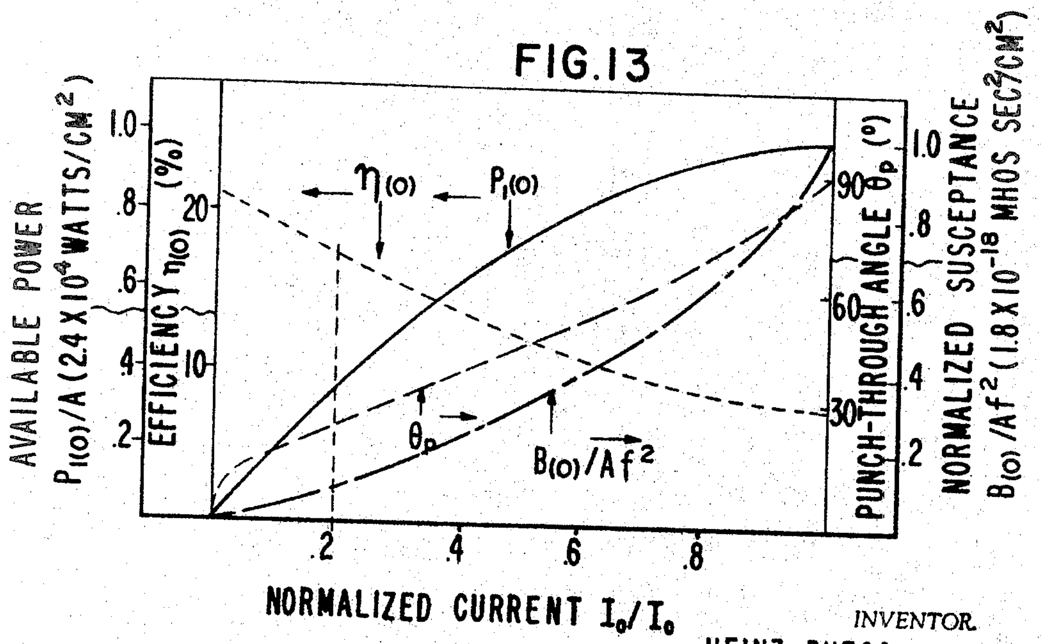
Figure 19:
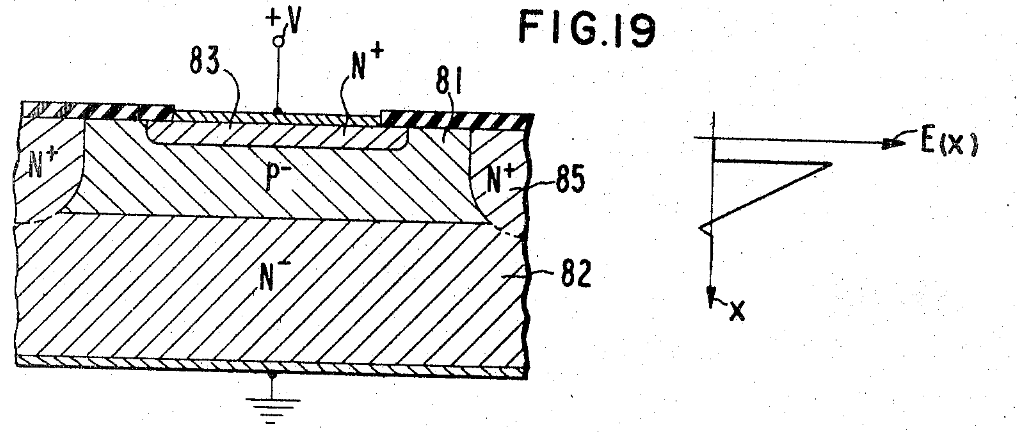

FIG. 6*a*–6*d* are a group of curves showing respectively the applied voltage waveform, the particle current injected into the drift region, the conduction current due to the injected particle current for the case of constant mobility, and the conduction current due to the injected particle current for the case of velocity saturation for a punch-through device;

FIG. 7 is a schematic representation of the preferred four-layer punch-through device according to the invention;

FIG. 8 is a pair of curves showing the field distribution in the device of FIG. 7 for an applied voltage slightly lower than the punch-through voltage and for an applied voltage equal to the punch-through voltage;

FIG. 9 is a polar plot for the conduction current phasor $\bar{I}_1$ for different transit angles;

FIG. 10 shows the variation of the field in the drift region due to the space charge of the injected carriers;

FIGS. 11*a* and 11*b* show the waveform of the applied voltage and the injected particle current for the device of FIG. 7;

FIGS. 12*a* and 12*b* show respectively the position of the injected charge cloud and the field distribution in the drift region for the times indicated in the applied voltage waveform shown in FIG. 12*c*;

FIG. 13 is a plot of efficiency, maximum available power density, normalized susceptance and required punch-through angle versus normalized D-C current density for a device according to the invention;

FIG. 14 is a plot maximum available microwave power and maximum permissible device area versus frequency for different susceptance levels, $B_{max.}$, of a device according to the invention; and FIGS 15–18 are cross-sectional views of practical geometries for realizing the schematic structure of the invention shown in FIG. 7;

FIG. 19 is a cross-sectional view of a practical geometry for realizing the schematic structure of the invention shown in FIG. 3.

Figure 1:
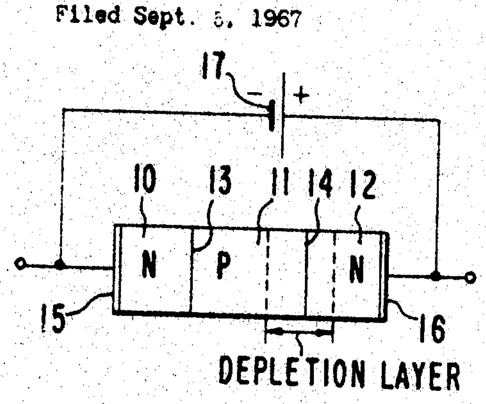
FIG. 1 PRIOR ART
FIG. 1 is a schematic diagram of a negative resistance device such as disclosed in the above mentioned Shockley patent.

Referring now to FIG. 1 there is shown the schematic representation of the negative resistance device proposed by Shockley in the above mentioned patent. The device consists essentially of three adjacent semiconductor regions 10, 11, and 12 of alternating conductivity type, i.e., NPN as illustrated, so as to form a first P-N junction 13 between the regions 10 and 11 and a second P-N junction 14 between the regions 11 and 12. Contact to the regions 10 and 12 is made by metal electrodes 15 and 16 respectively. In the operational device shown, a bias voltage is applied as shown between the electrodes 15 and 16 by means of a suitable voltage supply 17 so that the P-N junction 13 is forward biased and the P-N junction 14 is reverse biased. According to one mode of operation described by Shockley, the bias is such that the depletion region of the P-N junction 14 extends as indicated for a short distance into the P— type region 11. The bias is such, however, that the depletion region formed thereby will not extend sufficiently close to the P-N junction 13 to cause punch-through to result when an AC signal is applied between the contacts 15 and 16, i.e., the device is biased and operated at all times below punch-through. In any case, with the device biased as shown and with a superimposed A-C signal thereon, electrons will be emitted by the N— type region 10 and injected across the forward biased junction 13 into the region 11. The carriers then flow with a finite transit time through the region 11 and are collected by the reverse biased P-N junction 14. By properly tailoring the length and dopant concentrations in the region 11, the transit time of carriers there across will be such that the generated A-C current will be out of phase with the applied A-C voltage between 90° and 270°, thus resulting in a negative resistance. It should be noted, however, that with this mode of operation, the carriers injected into the region 11 must flow through the portion thereof not included in the depletion layer of the junction 14 by diffusion and then through the depletion layer portion of the region 11 by drift. Hence, in the portion of the region 11 not included in the depletion layer, the field is relatively low and the carriers do not travel with the maximum velocity. Because of the relatively long time required for the electrons to travel through the portions of the region 11 wherein the low fields exist, this characteristic of the device severely limits the operating frequencies of the devices to relatively low frequencies. Similarly, in another mode of operation of the devices disclosed by Shockley, wherein the device is always biased above the punch-through value, the emission of the carriers across the forward biased junction 13 will be space charge limited and therefore, the carriers again drift through relatively low fields at the beginning of their flow through the region 11. In summary, therefore, the Shockley devices described in the prior art are linear type negative resistance devices, which, due to the low field adjacent the forward bias junction, limit the operating frequencies thereof for reasonable dimensions.

Figure 2:
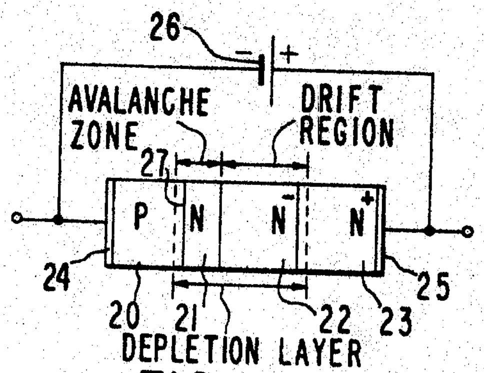
FIG. 2 PRIOR ART
FIG. 2 is a schematic diagram of a negative resistance device such as disclosed in the above mentioned Read patent.

Referring now to FIG. 2, there is shown the prior art negative resistance diode proposed by Read in the above mentioned patent. The device consists essentially of four layers 20, 21, 22, and 23 having impurity type configurations P, N, $N^-$, and $N^+$ respectively. Contact to the layers 20 and 23 is made by a pair of electrodes 24 and 25 respectively. In operation, the device is biased by means of the D-C bias source 26 such that the single P-N junction 27 formed between the layers 20 and 21 is reverse biased into avalanche, whereby charge carriers are injected by avalanche multiplication from the P— type region 20 into the N region 21. The injected carriers flow through the region 21 and the region 22 and are collected in the relatively high conductivity N+ region 23. Since the fields in the depletion layer which, as indicated, extend entirely through the regions 21 and 22 are relatively high, the carriers will flow through the regions 21 and 22 with maximum velocity, thus allowing larger operating frequencies for the device. The negative resistance effect is obtained by making the width of the regions 21 and 22 such that the transit time of the carrier flow thereacross will cause the generated A-C current to be out of phase with the applied A-C voltage by a phase angle between 90° and 270°. As mentioned above, although this structure overcomes the problem of long transit time required with the Shockley device, the device has the disadvantages of being wasteful in power because of the very high fields required for avalanche to occur and by the fact that the avalanche process is inherently noisy.

Referring now to FIG. 3, there is shown an embodiment of a negative resistance diode according to the invention which essentially combines the advantages of both of the above prior art structures while eliminating the disadvantages. The device, which structurally is similar to that by Shockley, consists essentially of a body of semiconductor material such as silicon, germanium, III–V compounds, etc. having a pair of zones or regions 30 and 31 of a first conductivity type, N— type in the illustrated example, separated by a third zone 32 of the opposite conductivity type (P— type). A P-N junction 33 is thereby formed between the region 30 and 32 and a second P-N junction 34 is formed between the zones 31 and 32. In analogy to a transistor, the zones 30, 31, and 32 may be referred to as the emitter, the collector, and the base zones respectively. The collector zone 31 as indicated preferably has a high impurity concentration indicated by the N+ in order that it operate as an efficient collector of the electrons and have a low resistance. Electrical contact to the emitter zone 30 and the collector zone 31 is accomplished by means of suitable metal layers 35 and 36 respectively. As with each of the prior art devices, the negative resistance effect in the device of FIG. 3 is caused by transit time of carriers through a zone of the device, in the instant case, through the base zone 32. Accordingly, in the construction of such a device the width of the zone 32 will depend upon the desired frequency of operation of the device; a typical width being in the order of 5 micrometers. The doping density in the device, however, can vary in any unspecified manner. For simplicity of presentation, in all of the following considerations, the doping density is considered to be uniform.

Turning now to the operation of the device, as opposed to the Shockley device, the negative resistance device according to the invention operates in the punch-through mode of operation. That is, the device is initially biased slightly below punch-through but in operation is driven into punch-through. The pronounced non-linearity occurring at punch-through leads to the desired negative resistance effect. Since the non-linearity at punch-through is the sina qua non of operation, a small signal analysis of the device is not possible and accordingly, an approximate large signal approach will be used in explaining the device.

In operation, a direct current voltage bias of a magnitude $V_o$ is applied across the terminals 35 and 36 by any convenient D–C bias source such as the battery 37.

With the polarity as shown, the base collector junction 34 is thus reverse biased and an electric field penetrates the base as shown by the solid lines in FIG. 4. The bias voltage $V_o$ is of such a magnitude that the depletion region penetrates the base 32 by an amount $w_d$ which is nearly equal to its total thickness. In transistor language this means that the transistor is biased nearly to or just below punch-through. In order that this condition can be obtained the impurity concentration in and the length of the base 32 have to be chosen low enough that avalanche breakdown does not occur before punch-through is achieved. The structure of FIG. 3 can then be treated as a floating base NPN transistor. For the conditions shown, the current through the device is equal to the base-collector reverse current multiplied by the common emitter current gain. Typical values are below 1 microampere.

Figure 5:
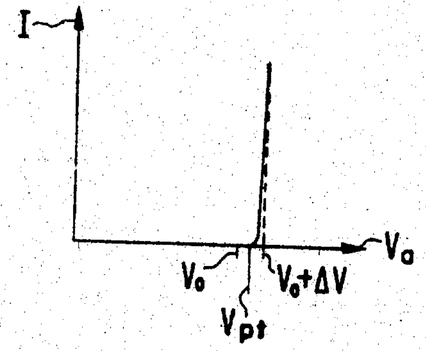
FIG. 5 is a curve showing the V–I characteristic of a punch-through device.

If the voltage across the device is now increased to $V_o+\Delta V$, the field configuration corresponding to the new voltage $V_o+\Delta V$ is shown as a dashed line in FIG. 4. The depletion region now punches-through to the emitter 30. The structure can no longer be treated as a transistor. Electrons are now injected directly into a depletion region through which they flow and are then collected by the N+ region 31. Accordingly, a large current flows through the device. The voltage-current relationship when the device is operated in this manner is shown in FIG. 5. It is exactly this non-linearity in the V–I characteristics occurring at the punch-through point ($V_{pt}$) which is utilized for a negative resistance device.

In order that the device operate as a negative resistance, the additional voltage component ($\Delta V$) necessary to drive the devices into punch-through is provided by an alternating voltage signal applied across the transistor 35–36. The means for providing the A-C signal is shown schematically by an A-C generator 38 in the figure. However, it is to be understood that this is for illustration only and that any means for providing the A-C signal may be utilized. For example, if the device is used in an oscillator circuit whereby the A-C signal may in fact be the built-up oscillations.

Figure 6:
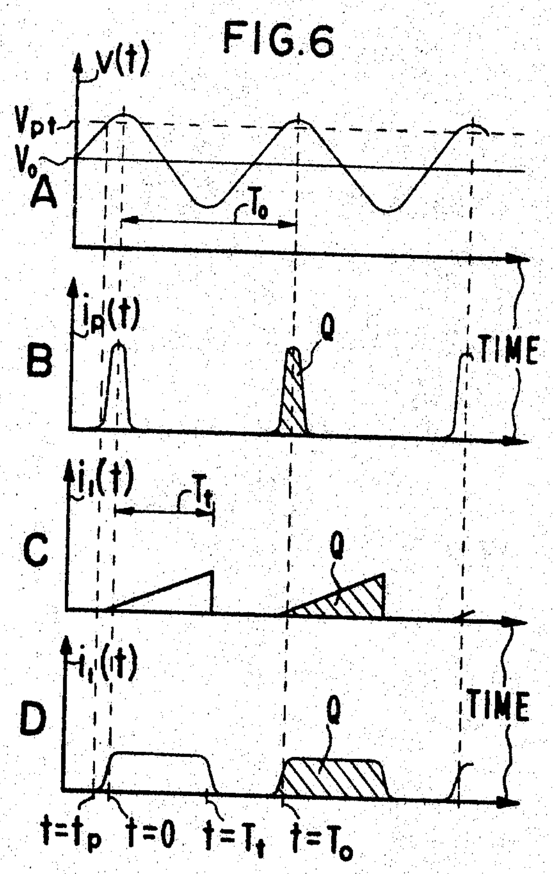

FIG. 6*a* shows such a sinusoidally varying signal superimposed on the biasing voltage $V_o$. During the time when the A-C signal is in a direction to aid the bias signal (the positive half cycle in the illustration), the depletion region of the reverse biased junction 34 widens toward the emitter 30. Toward the middle of the positive half cycle the structure punches-through, i.e., the depletion layers of the junctions 33 and 34 merge, and a cloud of electrons ($i_p$) is injected into the total resultant depletion region. This injection is shown in FIG 6*b*. These charges in transit induce a current denoted as $i_1(t)$ in FIG. 6*c* in the external leads 35 and 36 of the device. The current $i_1(t)$ is proportional to the instantaneous velocity of the electron cloud traveling through the depletion region. For the case of relatively low fields, where the carrier velocity is proportional to the field strength throughout the depletion region, the resulting current $i_1(t)$ thus has a triangular shape shown in FIG. 6*c*. On the other hand, if the field throughout most of the depletion region is high enough so that carriers travel at their maximum velocity, a rectangular current as shown in FIG. 6*d* is obtained. In either case, the current $i_1(t)$ is delayed with respect to the voltage. By a suitable choice of the width of the base zone 32, this delay can be made such that a sizable component of the current $i_1(t)$ is between 90° and 270° and, preferably 180° out of phase with the applied A-C voltage whereby the device exhibits a negative resistance and power can therefore be delivered to an external load.

Although the structure shown in FIG. 3 acts as a negative resistance power generator it does present a number of problems which do not render it ideal for this purpose. Firstly, as with the Shockley device, the injected carriers first drift through a region of rather low fields. The transit time through the zone 32 is therefore large and the frequency of operation limited to a few gHz. for practical dimensions. Furthermore, carrier injection can become space charge limited and thus degrade the non-linearity in the V–I characteristic on which operation of the device is based. Another problem with this embodiment is that large fields are obtained at the base-collector junction 34. In order to prevent avalanche breakdown at this junction, the A-C field swing and therefore the power output must be restricted.

In order to eliminate the problems with the device of FIG. 3 memtioned above, the device according to the invention is preferably structurally modified as shown in FIG. 7. In this figure, structures similar to that of FIG. 3 are denoted with the same reference numbers. In this embodiment of the invention, the primary function of base region or zone 32 is to provide the large drop in the field in the same manner as in the embodiment of FIG. 3. However, contrary to the structure of FIG. 3, the base region 32 does not provide the major portion of the transit time delay and, hence, as indicated, is rather small in width. The major portion of the transit time delay is furnished by modifying the third zone of the device of FIG. 3 so that it now is comprised of two separate regions of the same conductivity type but with different impurity concentrations, i.e. different resistivities. One of these regions, the high conductivity (N+) region 39, performs the same function as the entire zone 31 in the embodiment of FIG. 3. That is, it acts as the collector of the device. The other of these regions, the high resistivity region 40 which is located between the base zone 32 and the collector region 39, now provides the major portion of the transit time delay for the device (a small portion of the delay being provided by the transit time of the charges through the base 32). Accordingly, the width of the high resistivity region, which may be called the drift region, must be such as to provide the necessary phase shift of the frequency at which the device is to be operated so that the negative resistance effect will be realized, i.e., the A-C voltage from source 38 is between 90° and 270° out of phase with the A-C component of the generated current.

With the structure shown in FIG. 7, when a bias voltage which will reverse bias the junction 34 is applied, the depletion layer of the junction will initially reach through to the interface of the regions 39 and 40, thus depleting the drift region 40 of mobile carriers.

Increasing the reverse bias will then cause the depletion region to widen into the base 32 exactly as in the structure of FIG. 3. The field configuration for the device with the operating bias voltage $V_0$ applied, i.e., a bias value just below punch-through, is shown in solid line in FIG. 8. Again, only a small current flows through the device in this condition. If an additional voltage incremental $\Delta V$ is applied the depletion regions of the junctions 33 and 34 merge, resulting in punch-through and electrons are injected into the base 32. The field configuration for this condition is indicated with a dashed line in FIG. 8.

In order to provide a full understanding of the invention, a detailed analysis of the basic principles and the relationship of the various parameters is believed necessary. Such an analysis, together with certain design considerations, is presented below. If the field in the drift region 40 is large enough to assure limiting velocity, the carriers travel through this region with constant velocity and therefore induce a rectangular current $i_1(t)$ as shown in FIG. 6*d*. The current $i_1(t)$ can be decomposed in its sine-wave and cosine-wave components by means of Fourier analysis. The components of main interest are the ones corresponding to the fundamental frequency $\omega_0$ of the voltage cosine-wave. The amplitude of the cosine component, which is in phase with the voltage, is equal to $$I_{1R}=\frac{Q\omega_0}{\pi}\frac{\sin\theta_t}{\theta_t}=2I_0\frac{\sin\theta_t}{\theta_t} \quad (1)$$

where:

$\theta_t=\omega_0 T_t$=transit angle $T_t$=transit time through the drift region Q=charge injected into the drift region per cycle $I_0=Q\omega_0/2\pi$=D-C current The amplitude of the sine-wave component, which lags the voltage by 90°, is equal to $$I_{1I}=-\frac{Q\omega_0}{\pi}\frac{1-\cos\theta_t}{\theta_t} \quad (2)$$

The phase shift $\phi$ of the fundamental current wave form with respect to the voltage is therefore given by $$\phi=\frac{\theta_t}{2} \quad (3)$$

The magnitude of the fundamental component is:

$$I_1=\sqrt{I_{1R}^2+I_{1I}^2}=\frac{Q\omega_0}{\pi}\frac{\sin\frac{\theta_t}{2}}{\frac{\theta_t}{2}} \quad (4)$$

The results of such an analysis are shown in FIG. 9 in form of a polar plot for the current phasor $I_1$ relative to the voltage phasor $V_1$. The variable is the delay time $T_t$ of the carriers compared to the period of oscillation $T_0$.

In addition to the current $I_1$ there is also a capacitive current $I_2$ which is due to the normal depletion region capacitance. In order to obtain the total current flowing in the external leads of the device, the capacitive current $I_2$ must be added to the current $I_1$.

The resulting current phasor corresponds not only to the total fundamental current component relative to the D-C current ($I_0$) but also to the fundamental current component per unit of applied voltage, or in other words to the admittance of the device. This is shown in the next section, where the relationship between the A-C voltage and the injected charge Q is derived. The component of the phasor pointing in the negative *y*-direction indicates an inductive admittance. The component pointing in the negative *x*-direction indicates a negative conductance. Obviously, the negative conductance can be maximized for a certain relative transit time delay. Setting the derivation of $I_{1R}$ with respect to $\theta_t$ equal to zero, the optimum transit angle $\theta_{t(o)}$ is obtained from the condition that $$\theta_{t(o)}=\tan\theta_{t(o)}$$

Hence, $$\theta_{t(o)}\approx\frac{3\pi}{2} \quad (5)$$

the optimum width of the depletion layer is thus, $$w_{d(o)}=\frac{\theta_{t(o)}v_m}{\omega_o}\approx\frac{3\pi v_m}{2\omega_o}=\frac{.75v_m}{f_o} \quad (6)$$

where $v_m$ is the maximum carrier velocity.

The real component of the conduction current for the optimum transit angle $[I_{1R(o)}]$ according to Equations 1 and 5 is therefore $$I_{1R(o)}=-\frac{2Q\omega_o}{3\pi^2}=-\frac{4I_o}{3\pi} \quad (7)$$

In order to obtain the total admittance we have to treat the injection of charges by punch-through in more detail. At the moment of punch-through the injection of charges from the emitter 30 into the depletion region is limited by the space charge which these injected carriers set up.

According to Gauss' law an infinite signal charge $dQ$ cause a change in the field intensity of $dE$ given by $$dE=\frac{dQ}{A\epsilon}=\frac{i_p(t)\,dt}{A\epsilon} \quad (8)$$

where:

$i_p(t)$=injected particle current $\epsilon$=dielectric constant=1.06 pf./cm. for silicon A=device area.

If punch-through occurs at time $t=-t_p$, the total field change due to the injected space charge is at time $t$:

$$\Delta E(t)=\frac{1}{A\epsilon}\int_{-t_p}^{t} i_p(t)dt \qquad (9)$$

If the whole injection process occurs in a time which is short compared to the transit time of the carriers, then the field change ΔE occurs over a distance which is short compared to the depletion layer width ($w_d$). From the illustration of this condition shown in FIG. 10 it can be seen that the change in voltage can therefore be written as:

$$\Delta V(t)\approx\Delta E(t)w_d=\frac{w_d}{A\epsilon}\int_{-t_p}^{t} i_p(t)dt \qquad (10)$$

This voltage increase is supplied by the A-C voltage in excess of the punch-through voltage, hence $$\Delta V(t)=\frac{w_d}{A\epsilon}\int_{-t_p}^{t} i_p(t)dt=V_1(\cos\omega_o t-\cos\omega_o t_p) \qquad (11)$$

The relationship between the injected particle current and the applied voltage can now be obtained by differentiation as $$i_p(t)=\begin{cases}\frac{A\epsilon\omega_o}{w_d}V_1\sin\omega_o t\ldots\text{ for } nT_o-tp<t<nT_o\\ 0\ldots\text{ for } nT_o<t<(n+1)T_o-t_p\end{cases}\qquad n=0,1,2\ldots \qquad (12)$$

The situation is graphically illustrated in FIG. 11.

The charge Q injected during one cycle can now be obtained by integrating Equation 12 from $t=-t_p$ to $t=0$ as $$Q=\int_{-t_p}^{0} i_p(t)dt=\frac{A\epsilon}{w_d}V_1(1-\cos\theta_p) \qquad (13)$$

where: $\theta_p=\omega_o t_p$=punch-through angle.

Inserting Q from Equation 12 into 1 and 2 yields for the admittance and the susceptance respectively of the device:

$$G=\frac{I_{1R}}{V_1}=\frac{A\epsilon\omega_o}{w_d\pi}\frac{\sin\theta_t}{\theta_t}(1-\cos\theta_p)=\omega_o C_d\frac{\sin\theta_t}{\pi\theta_t}(1-\cos\theta_p) \qquad (14)$$

$$B=\frac{I_{1I}+I_2}{V_1}=\frac{A\epsilon\omega_o}{w_d\pi}\frac{\cos\theta_t-1}{\theta_t}(1-\cos\theta_p)+\omega_o C_d=\omega_o C_d\left[1-\frac{1-\cos\theta_t}{\pi\theta_t}(1-\cos\theta_p)\right] \qquad (15)$$

where:

$$C_d=\frac{A\epsilon}{w_d}=\text{depletion layer capacitance} \qquad (16)$$

The corresponding values for the optimum transit angle given in Equation 5 are:

$$G_{(o)}=-2\omega_o C_d\frac{1-\cos\theta_p}{3\pi^2}=-\frac{4\omega_o^2 A\epsilon}{9\pi^3 v_m}(1-\cos\theta_p) \qquad (17)$$

$$B_{(o)}=\omega_o C_d\left[1-\frac{2}{3\pi^2}(1-\cos\theta_p)\right]\approx\omega_o C_d=\frac{2\omega_o^2 A\epsilon}{3\pi v_m} \qquad (18)$$

The device thus is seen to have a negative conductance and a capacitive susceptance. The second forms of Equations 17 and 18 were obtained by inserting $w_{d(o)}$ of Equation 6 into the expression for the depletion layer capacitance $C_d$. These equations demonstrate the fact that the optimum admittance increases as the square of the frequency.

The Q of the device for small punch-through angles is:

$$Q^*=\frac{B_{(o)}}{G_{(o)}}\approx-\frac{3\pi^2}{2}=-15 \qquad (19)$$

which is a relatively low value of Q. It should be recalled that a low negative Q is desirable for a negative resistance oscillating device.

In order to obtain an estimate of the maximum power output and of the power conversion efficiency of the device, the following simplifying assumptions are made:

(1) The field in the drift region is constant. This is a good approximation since in a practical device the resistivity of the drift region is chosen high enough that the space charge of the ionized impurities causes only a small percentage change of the field across the drift region.

(2) The carriers are injected as an δ-function at the time of the maximum positive amplitude of the voltage. This assumption is justifiable as long as punch-through occurs near the positive peak of the voltage. (That is, as long as $\theta_p\ll 90°$.)

The limitations of the power output and of the oscillator efficiency can be understood by considering the field in the drift region as a function of time and position.

FIG. 12*a* shows the position of the electron cloud and FIG. 12*b* the corresponding field distribution in the drift region of the device for different times within a voltage cycle indicated in FIG. 12*b* for the case of the optimum transit time $T_t=3/4T_o$. The step ΔE in the field distributions is caused by the space charge of the carriers in transit. In terms of the real current component for optimum operating conditions ($I_{1R(o)}$) as given by Equations 1 and 5, the field step is $$\Delta E=\frac{Q}{A\epsilon}=\frac{2\pi I_o}{A\epsilon\omega_o}=\frac{3\pi^2|I_{1R(o)}|}{2\omega_o\epsilon A} \qquad (20)$$

The field throughout the drift region 40 should be high enough so that carriers flow with maximum velocity even at the negative peak of the A-C voltage swing. At the same time the field throughout the drift region 40 should be low enough that no avalanche multiplication occurs at the peak of the positive half cycle of the applied A-C voltage signal. From FIG. 12 it follows that the corresponding requirement on the minimum voltage is $$V_o-V_1\geq\frac{w_d\Delta E}{3}+w_d E_{min.}\approx\frac{w_d\Delta E}{3} \qquad (21)$$

Neglecting $E_{min.}\approx 2\cdot 10^4$ v./cm. in comparison with the maximum field in the device is not necessary but it simplifies the calculation and only leads to a small error.

Avalanche multiplication is assumed to become important at a field $E_m$ and hence we have for the maximum voltage:

$$V_0+V_1\leq w_d E_m \qquad (22)$$

From Equations 21 and 22 the optimum D-C biasing voltage $V_o$ and the maximum allowable A-C voltage amplitude $V_1$ are obtained as $$V_0=\frac{w_d}{2}\left(E_m+\frac{\Delta E}{3}\right) \qquad (23)$$

$$V_1=\frac{w_d}{2}\left(E_m-\frac{\Delta E}{3}\right) \qquad (24)$$

If ΔE from Equation 20 is substituted into Equation 24, the A-C voltage amplitude for the optimum transit angle becomes $$V_{1(o)}=\frac{w_d}{2}\left(E_m-\frac{2\pi}{3\epsilon A\omega_o}I_o\right) \qquad (25)$$

From Equations 7 and 25 we now obtain for the available microwave power:

$$P_{1(o)}=\frac{V_{1(o)}I_{1R(o)}}{2}=\frac{w_d\left(E_m-\frac{2\pi}{3\epsilon A\omega_o}I_o\right)I_o}{3\pi} \qquad (26)$$

For small currents the second term in the numerator of Equation 26 can be neglected and it is seen that the available microwave power increases approximately linearly with the A-C current. As the current level increases, this term, which represents the field distortion due to the injected space-charge, becomes important and limits the achievable voltage swing. The current level ($I_o^*$) for which the available microwave power is a maximum is $$I_o^* = \frac{3E_m \epsilon A\omega_o}{4\pi} \quad (27)$$

The corresponding A-C voltage amplitude and the available microwave power are:

$$V_{1(o)}^* = \frac{w_d E_m}{4} \quad (28)$$

$$P_{1(o)}^* = \frac{3v_m \epsilon A E_m^2}{16\pi} \approx 2.4 \cdot 10^4 \text{ watts/cm.}^2 \quad (29)$$

The numerical value was obtained by assuming $v_m = 10^7$ cm./sec. and $E_m = 2 \cdot 10^5$ v./cm.

In FIG. 13 the available microwave power is plotted as a function of the relative current level. Also shown is the power conversion efficiency ($\eta_{(o)}$) which from Equations 23 and 26 is $$\eta_{(o)} = \frac{P_{1(o)}}{V_o I_o} 100\% = \frac{2}{3\pi} \frac{E_m - \frac{2\pi}{3\epsilon A\omega_o} I_o}{E_m + \frac{2\pi}{3\epsilon A\omega_o}} 100\% \quad (30)$$

The power conversion efficiency is equal to $$\frac{2}{3\pi} 100\% = 21\%$$

in the limit of zero current and decreases to one third of this value as the current $I_o^*$.

An increase of the current level is accompanied by an increase in the punch-through angle $\theta_p$. From Equations 13, 27, and 28 one obtains:

$$\frac{I_o}{I_o^*} \cdot \frac{V_{1(\ )}^*}{V_{1(o)}} = 1 - \cos\theta_p \quad (31)$$

FIG. 13 also shows the punch-through angle versus the current for the maximum permissible A-C voltage as calculated from Equation 31. It is evident that the maximum available power, $P_{1(o)}^*$ cannot be achieved in practice because it would require a punch-through angle of 90°, i.e., punch-through would occur at the zero crossing of the A-C component of the voltage and not near the maximum voltage point as was assumed in the derivation. This is undesirable because it introduces a phase-lead of the injected particle current with respect to the voltage which partially destroys the phase lag subsequently achieved by transit tme delay. Practically one would therefore restrict the current to $I_o < I_o^*/5$ and thus have approximately $\eta_{(o)} > 18\%$, $P_{1(o)} < 10^4$ watts/cm.$^2$ and $\theta_p < 30°$ Once the current level (or in other words the punch-through angle) and the frequency of operation are fixed, the admittance per unit area is also determined according to Equations 17 and 18. The susceptance per unit area divided by the square of the frequency is also plotted in FIG. 13. In an oscillator the circuit, most probably a cavity, must supply the complex conjugate of the device susceptance. This circuit susceptance however cannot be made arbitrarily large in practice. These considerations thus limit the total available microwave power and also put an upper limit on the device area. Denoting the maximum practically achievable circuit susceptance by $B_{max.}$, the maximum device area is $$A_{max.} = \frac{B_{max.}}{B_{(o)}} = \frac{B_{max.}}{B_{(o)}/f^2} \frac{1}{f_o^2} \quad (32)$$

The maximum available power is accordingly $$P_{max.} = A_{max.} P_{1(o)} \quad (33)$$

For a current level of $I_o/I_o^* = 0.2$ and $B_{max.} = 1$ mho, one obtains from FIG. 11

$$A_{max.} = 5 \cdot 10^{16} \frac{1}{f_o^2} \text{ (cm.}^2\text{/sec.}^2) \quad (34)$$

and $$P_{max.} = 4.5 \cdot 10^{20} \frac{1}{f_o^2} \text{ (watts/sec.)} \quad (35)$$

The device area and the maximum available microwave power according to Equations 34 and 35 are plotted in FIG. 14 versus the operating frequency $f_o$.

In the following the considerations which lead to the determination of the device dimensions and doping densities are given.

The width of the drift region 40 is directly given by the required operating frequency $f_o$ from the condition that the transit angle be equal to its optimum value, $\theta_p = 270°$. Assuming a maximum carrier velocity of $10^7$ cm./sec. one then obtains from Equation 6 for the width of the drift region $$w_{d(o)} = \frac{7.5 \cdot 10^6}{f_o} \text{ (cm.)} \quad (36)$$

The width of the base region 32 should be such that charge carriers travel with maximum velocity through most of the total depletion region. The base widths ($w_b$) should therefore be small compared to the width of the drift region 40. A ratio of $w_d \div w_b$ of 3 or higher is adequate.

In order to determine the impurity concentration in the base region 32, it should be kept in mind that the only function of the base in the embodiment of FIG. 7 is to provide a rapid increase of the field from zero in the emitter region 30 to the value desired in the drift region 40 at punch-through. From the discussion above, in the section dealing with power output, it follows that an average field of between $E_m$ and $E_m/2$ in the drift region 40 at punch-through gives the highest microwave power. The uncompensated impurity density in the base ($Q_B$) should therefore be of the order of $$Q_B = \int_0^{W_B} N_B dx = \frac{\epsilon}{q} \frac{3}{4} E_m \quad (37)$$

Using a value of $E_m$ of $2 \cdot 10^5$ v./cm., the impurity density in the base 32 should therefore be between about $3 \times 10^{11}$ atoms/cm.$^2$ and $3 \times 10^{12}$ atoms/cm.$^2$ or, in other words, approximately $10^{12}$ atoms/cm.$^2$.

To determine the impurity concentration $N_d$ in the drift region 40, it should be remembered that to maximize the A-C field swing it is desired to have a substantially constant field in the drift region 40. If the allowable field variation is somewhat arbitrarily limited to 20% of the average field in the drift region, the limits on the width and the doping density of the drift region are:

$$w_{d(o)} N_d < \frac{\epsilon}{q} \cdot 0.2 \cdot \frac{3}{4} E_m \quad (38)$$

or approximately $2 \cdot 10^{11}$ atoms/cm.$^2$.

The impurity concentration in the collector region 39 ($N_c$) should be as high as possible in order to minimize the series resistance of the device. In any case, however, it is desired that the depletion layer penetrate the collector region by an amount which is small compared to the width of the drift region 40, hence $$N_c \gg \frac{3\epsilon}{4q} \frac{E_m}{w_{d(o)}} \quad (39)$$

It is the function of the emitter 30 to inject charge carriers into the total depletion region. Unlike in transistors, where the impurity density in the emitter has to be high compared to the impurity density of the base in order to obtain a high injection efficiency, a relative low impurity concentration is sufficient for the present emitter. It has been mentioned that the proposed four layer structure acts like a floating base transistor for voltages smaller than the punch-through voltage. If the emitter efficiency of this transistor is high, a high leakage current is multiplied by a very high common emitter current gain. In order to minimize this leakage current and thus render the V–I characteristic more non-linear, a low common emitter current gain factor of a corresponding transistor is desired. This can best be achieved by designing the structure such that the equivalent transistor has a poor emitter efficiency. It is therefore desired to have an impurity concentration in the emitter 30 of the same order or smaller than the impurity concentration in the base 32. Manufacturing considerations however might make an impurity density in the emitter which is slightly higher than impurity density in the base the more reasonable choice.

The active area of the device determines its impedance level. From Equations 34 and 6 it is found that for a maximum circuit susceptance of $B_{max.}=1$ mho, the radius R of the active area of a circular device in terms of the width of the drift region 40 should be:

$$R \leq 17 w_d \qquad (40)$$

Typical device parameters utilizing the above considerations and the anticipated performance are given in the following table. In determining certain of these results a value of $2 \cdot 10^5$ v./cm. for $E_m$, $10^7$ cm./sec. for $v_m$ and 0.2 (corresponding to $\theta_p$ of 27°) for $I_o/I_o^*$ was used.

Figure 15:
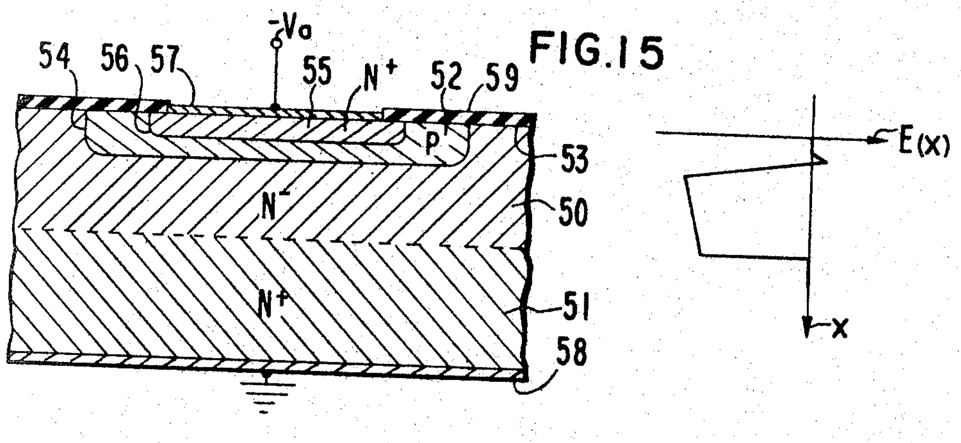
Figure 16:
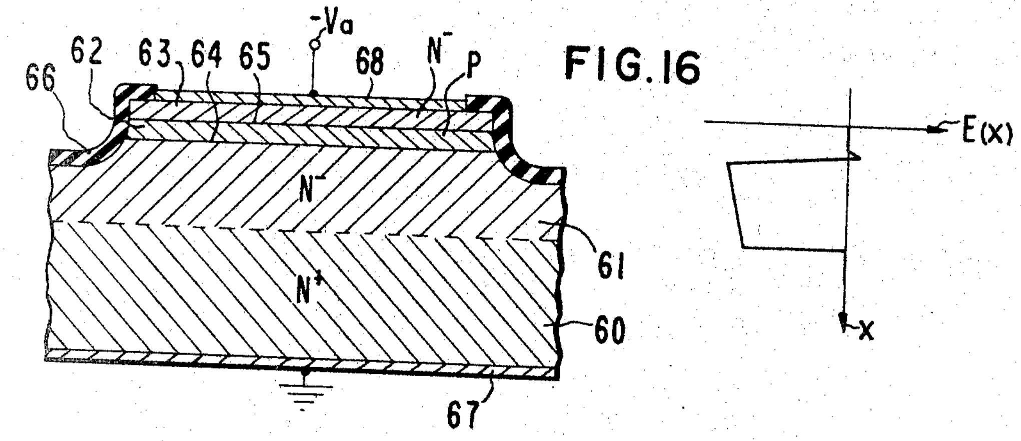
Figure 17:
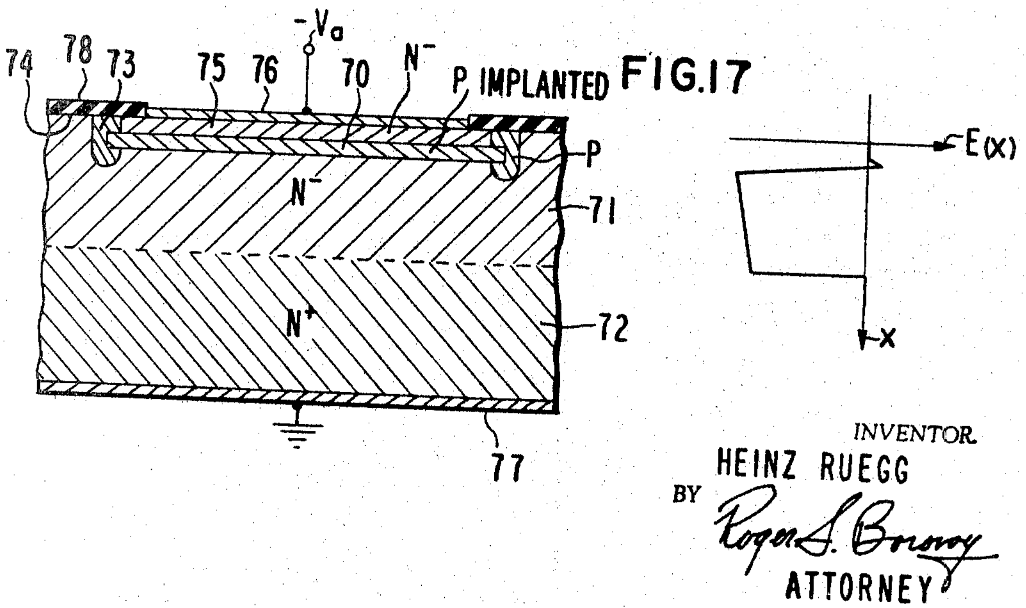

The disadvantages of a high emitter injection efficiency with the structure when using the structure of FIG. 15 are overcome with the structure of FIG. 16 which is an epitaxial mesa structure. In this structure, the device comprises an N+ substrate 60, forming the collector region of the device, on which has been formed by successive epitaxial depositions, an N— drift region 61, a P— type base region 62, and an N— emitter region 63. The edges of the plan P-N junction 64 between the regions 61 and 62 the plain P-N junction 65 between the regions 62 and 63 are protected from the ambient by a protective insulating layer 66 such as a silicon oxide. Contact to the collector region 60 and the emitter region 63 are again provided by means of deposited metal layers 67 and 68 respectively. With this embodiment of the invention, the thickness and the doping density of the P— type base regions 62 are rather critical. The base must provide a field drop of the order of $10^5$ volts per centimeter, thus requiring an uncompensated impurity density therein of the order of $10^{12}$ atoms per square centimeter. A resistivity of 1.5 ohms-centimeter and a thickness of 1 micron are typical for the region 62.

Another structure for realizing the four-layer schematic device shown in FIG. 7 and having the low-Q base layer and the desired low emitter efficiency is shown in FIG.

| Frequency | Device Parameters | | | | | | | Performance | | | | |
|---|---|---|---|---|---|---|---|---|---|---|---|---|
| $f_o$ | $w_d$ | $w_b$ | $N_d$ | $\rho_d$* | $N_o$ | R | $A_{max.}$ | $P_{max.}$ | $I_o$ | $I_o$ | $V_o$ | $\eta$ |
| GHz | μm | μm | Atoms/cm.³ | Ωcm. | Atoms/cm.³ | Mil. | cm.² | Watts | Watts | Amps | Volts | Percent |
| 1 | 75 | <25 | $<2.7 \cdot 10^{13}$ | >180 | $>>1.4 \cdot 10^{14}$ | <50 | $5 \cdot 10^{-2}$ | 450 | 2,500 | 3.0 | 825 | 20 |
| 5 | 15 | <5 | $<8 \cdot 10^{13}$ | >60 | $>>4 \cdot 10^{14}$ | <10 | $2 \cdot 10^{-3}$ | 18 | 100 | 0.6 | 165 | 20 |
| 10 | 7.5 | <2.5 | $<2.7 \cdot 10^{14}$ | >18 | $>>1.4 \cdot 10^{15}$ | <5 | $5 \cdot 10^{-4}$ | 4.5 | 25 | 0.3 | 82.5 | 20 |
| 50 | 1.5 | <0.5 | $<8 \cdot 10^{14}$ | >6 | $>>4 \cdot 10^{15}$ | <1 | $2 \cdot 10^{-5}$ | 0.18 | 1.0 | 0.06 | 16.5 | 20 |

*$\rho_d$ = Resistivity of drift region for n-type material.

Referring now to FIGS. 15–18, there is shown a number of practical embodiments of realizing the perferred embodiment of the invention shown schematically in FIG. 7. In each of these figures, a plot of the field distribution in the device is shown immediately to the right thereof. As shown in FIG. 15, one of the easiest ways to realize the four-layer structure shown in FIG. 7 is to construct the device in the same manner used for double diffused epitaxial transistors. As shown in the figure, the device consists essentially of a high resistivity N— layer 50 which has been epitaxially grown on an N+ substrate 51 by conventional epitaxial growth techniques. A P— type base region 52 is then formed within the epitaxial layer 50 adjacent the surface 53 thereof by well-known solid state diffusion techniques. The P— type region 52 forms a P-N junction 54 with the layer 50 which junction extends to the surface 53 thereof. Formed within the base region 52, also by solid state diffusion techniques, is the N+ emitter region 55 which forms a P-N junction 56 with the region 52 extending to the surface 53. With this embodiment the emitter region 55 should be diffused deep enough into the base region 52 to give a sufficiently low base-Q for punch-through to occur before avalanche breakdown of the junction 54 occurs when the device is in operation. Electrical contact to the emitter region 55 and to the collector region 51 may be made in any suitable manner, for example, by deposited electrical layers 57 and 58 respectively of a suitable metal such as aluminum. The remainder of the portion of the surface 53 not covered by the metal electrodes 57 is covered by a protective insulating layer 59 such as an oxide of silicon. The device of FIG. 15 offers the advantage that during the processing, the diffusion of the emitter region of layer 55 can be tailored to give the desired punch-through voltage. The structure does have the disadvantage, however, of high emitter efficiency and, hence, a high common emitter current gain for the equivalent transistor. As mentioned above, this leads to an ill-defined punch-through point.

17. In this structure, a P— type base region 70 having the desired base-Q is formed in an N— layer 71 which has been epitaxially grown on an N+ substrate 72 by means of ion implantation. The processes for forming such a region by implanting the ions are well-known in the art. In order to properly define the desired four-layer structure, however, prior to the ion implantation to form the region 70, a P— type isolation ring 73 is first formed in the layer 71 adjacent the surface 74 thereof, and the region 70 is formed within the confines of the ring as indicated. The net result of the isolation ring 73 is to isolate a portion 75 of the N— layer 71, which portion then functions as the emitter of the device. As with the other embodiments, electrical contact to the emitter region 75 and the collector region 72 is by means of metal layers 76 and 77 respectively while the remainder of the surface 74, and especially the edge of the junctions formed between the regions 71 and 73 is covered with a protective insulating layer 78. With this embodiment of the invention, the control of the drop in the field in the base region 70 depends directly on the control over the amount of implanted active dopant atoms, and hence, can be very accurately determined.

Figure 18:
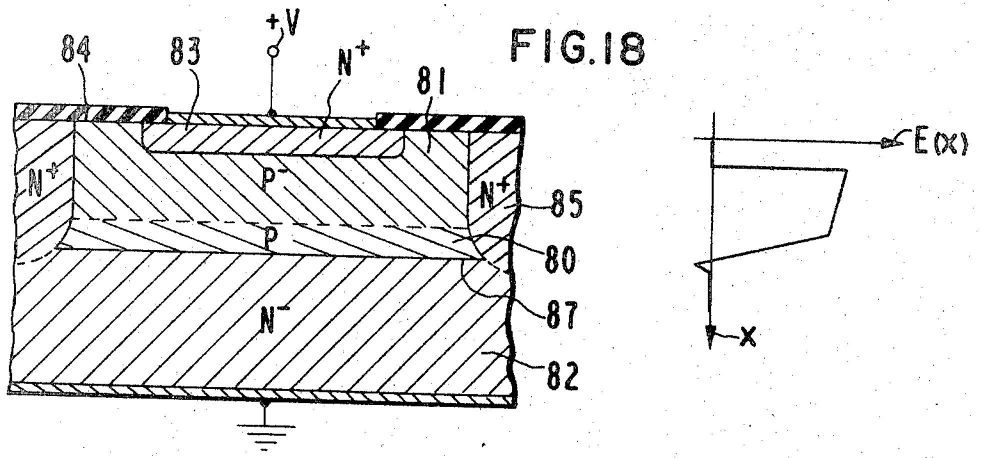

FIG. 18 shows another embodiment of a practical geometry for realizing the four-layer structure of FIG. 7. However, in this embodiment the substrate acts as the emitter rather than the collector as in each of the embodiments of FIGS. 15 and 17. This structure may be realized by first epitaxially growing a P type base region 80 and then a high resistivity P— drift region 81 on the surface of an N— wafer 82 which acts as the emitter of the device. The collector region for the device may then be formed by diffusing an N+ type region 83 adjacent the surface 84 of the region 81. The P type regions 80 and 81 are isolated by means of a deep N+ diffusion from the surface 84 to form an N+ ring 85. As is obvious from the plot to the right of the figure, punch-through in this embodiment occurs at the junction 87 formed between the P type region 80 and the N— region 82.

Each of the practical configurations of the invention shown in FIGS. 15–18 has been a realization of the four-layer structure shown in FIG. 7. FIG. 19 is an illustration of a practical realization of the three-layer structure according to the invention shown in FIG. 3. As is evident from the figure, this structure is essentially the same as that shown in FIG. 18 except that the P type epitaxial base layer 80 has been omitted. Consequently, the entire drift region is formed within the high resistivity P− region 81 as indicated by the plot to the right thereof. It should be noted, however, that practical realizations of the three-layer structure are not limited to this particular configuration but that structures similar to those shown in the other embodiments of the practical four-layer devices may be utilized. It should also be noted that in each of the practical realizations shown in FIGS. 15–19, that the structures may be formed with the conductivity type of the respective regions being the opposite to those illustrated.

In summary, a new negative resistance diode has been described wherein a frequency dependent negative resistance is obtained by utilizing the transit time of carriers injected into a depletion region. Injection occurs across a forward biased junction by punch-through. Both a three-layer and a four-layer structure have been described with the use of a four-layer structure being preferred since it allows one to obtain abrupt punch-through and assures high fields, therefore scattering limited carrier velocities throughout the depletion region.

Obviously, various modifications are possible in light of the disclosure without departing from the spirit and scope of the invention. Accordingly, the invention is to be limited only as recited in the appended claims.

What is claimed is:

1. A negative resistance semiconductor device comprising a body of monocrystalline semiconductor material having first and second zones of a first conductivity type separated by a third zone of the opposite conductivity type so that first and second P-N junctions are formed between said first and said third and said second and said third zones respectively:

- a separate electrical contact for said first and second zones, with at least the portion of said second zone adjacent the contact thereto being highly conductive;
- means for applying a bias potential to said contacts to reverse bias said second junction to a value just below the punch-through potential, and;
- means for applying an alternating signal to said body such that the magnitude of the combined bias and the signal in the bias aiding direction is sufficient to merge the depletion layer of said first and second junctions, resulting in punch-through and the injection of current into the resultant depletion layer from said first zone, said second and third zones having widths and impurity concentrations such that the transit time of charge carriers through said total resultant depletion layer results in the phase angle between said applied signal and the alternating component of the generated current being between 90° and 270°.

2. The device of claim 1 wherein said total depletion layer extends from said first to said second P-N junction and is entirely within said third zone.

3. The device of claim 1 wherein said second zone comprises adjacent regions of high and low conductivity with said low conductivity region being adjacent said second P-N junction, whereby said total resultant depletion region extends from said first P-N junction, through said third zone and the low conductivity region of said second zone to said high conductivity region of said second zone.

4. The device of claim 3 wherein said bias potential is of a sufficient value to cause the depletion layer of said reverse biased second P-N junction to extend through said low conductivity region of said second zone.

5. A negative resistance semiconductor device comprising a body of monocrystalline semiconductor material having:

- a first region of a first conductivity type;
- a second region of the opposite conductivity type adjacent said first region and forming a P-N junction therebetween, said second region containing a net characteristic impurity density between $3\times10^{11}$ and $3\times10^{12}$ impurity atoms/cm.$^2$;
- a third region of low conductivity and of said first conductivity type adjacent said second region and forming a second P-N junction therebetween;
- a highly conductive fourth region of said first conductivity type adjacent said third region;
- means for applying a bias to said body to reverse bias said second junction and cause its depletion layer to extend through said third region; and
- means for applying an alternating signal to said body, the magnitude of the combined bias and the signal in the bias aiding direction being sufficient to merge the depletion layers of said first and second P-N junctions whereby current will be injected into the resultant total depletion layer, said third region having a width such that the transit time of charge carriers through said second and third regions results in the phase angle between said applied signal and the alternating component of the generated current being between 90° and 270°.

6. The device of claim 5 wherein the width of said second region is small relative to the width of said third region.

7. The device of claim 5 wherein the net characteristic impurity concentration of said first region is of an order of magnitude no greater than that of said second region.

8. The device of claim 6 wherein said third region has a net characteristic impurity density of approximately $2K10^{11}$ atoms per cm.$^2$ where K is the percent of allowable field variation of the average field in said third region.

9. The device of claim 5 wherein the net characteristic impurity concentration in said fourth region is greater than $$\frac{3}{4}\frac{\epsilon}{q}\frac{E_m}{w_d}$$

where:

$\epsilon$=the dielectric constant of the semiconductor material
$q$=the charge on an electron
$E_m$=the maximum electric field in the third region
$w_d$=the width of the third region.

10. The device of claim 6 wherein the width of said second region is small relative to the width of said third region.

11. A microwave punch-through negative resistance semiconductor device comprising:

- a semiconductor body having four consecutive regions, said first, third and fourth regions being of a first conductivity type with said third region having a low concentration of the characteristic impurity relative to said first and fourth regions, said second region being of the opposite conductivity type and forming first and second P-N junctions with said first and third regions respectively;
- means for applying a bias signal between said first and fourth regions to reverse bias said second junction and cause its depletion layer to extend through said third regions, said bias potential being insufficient to cause said depletion layer to extend through said second region; and
- means for applying an alternating voltage signal between said first and fourth regions, the magnitude of the combined bias and the signal in the bias aiding direction being sufficient to merge the depletion layers of said first and second P-N junctions, whereby current will be injected into the resultant total depletion layer, said alternating signal having a frequency related to the width of said total depletion layer such that the transit time of charge carriers through said second and third zones causes the phase angle between the said applied voltage signal and the alternating component of the generated current to be between 90° and 270°.

12. The device of claim 11 wherein the width of said second region is small relative to that of said third region.

13. The device of claim 12 wherein said second region has a net characteristic impurity density of between $3\times10^{11}$ and $3\times10^{12}$ impurity atoms/cm.[2].

14. The device of claim 13 wherein the net characteristic impurity concentration in said fourth region is greater than $$\frac{3}{4}\frac{\epsilon}{q}\frac{E_m}{w_d}$$

where:

$\epsilon$=the dielectric constant of the semiconductor material $q$=the charge on an electron $E_m$=the maximum electric field in the third region $w_d$=the width of the third region.

15. The device of claim 14 wherein the width of said third region is approximately equal to $$\frac{3v_m}{4f}$$

where:

$v_m$=the maximum velocity of the charge carriers $f$=the frequency of the alternating signal.

References Cited

UNITED STATES PATENTS

| | | | |
|---|---|---|---|
| 3,013,161 | 12/1961 | Garr et al. | 317—235 |
| 3,393,376 | 7/1968 | Warner | 317—235 |

JERRY D. CRAIG, Primary Examiner

U.S. Cl. X.R.

317—234; 331—115